Nov. 29, 1955     A. P. DRUMMOND     2,724,975
PRESSED STEEL PULLEY
Filed Oct. 15, 1952
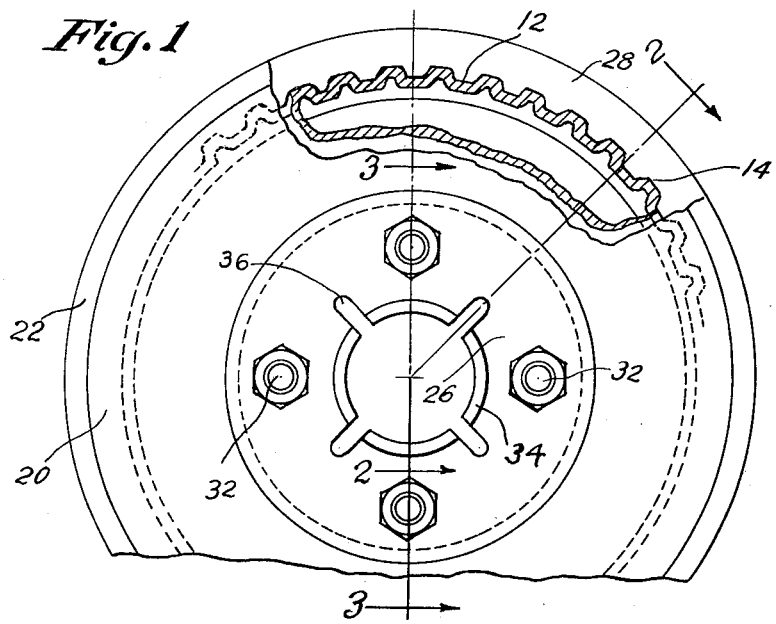
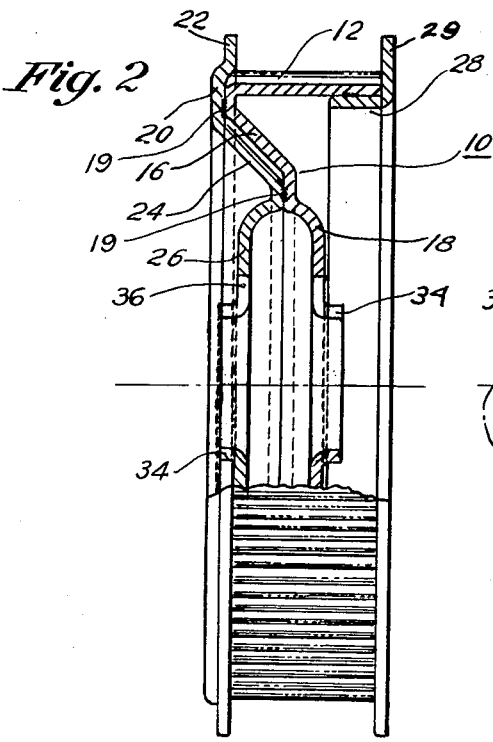
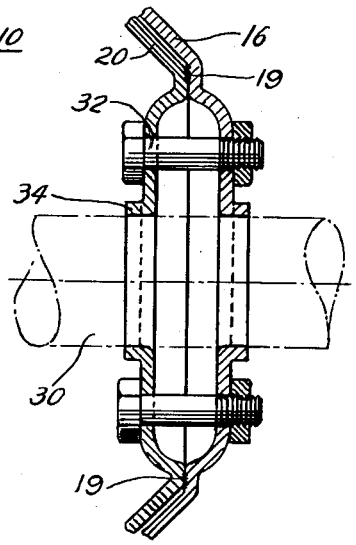
INVENTOR
A. PRICE DRUMMOND
BY
Joseph H. Schofield
ATTORNEY United States Patent Office 2,724,975
Patented Nov. 29, 1955

2,724,975

PRESSED STEEL PULLEY

Arthur P. Drummond, West Hartford, Conn., assignor to Niles-Bement-Pond Company, West Hartford, Conn., a corporation of New Jersey Application October 15, 1952, Serial No. 314,878

3 Claims. (Cl. 74—230.8)

This invention relates to pulleys and more particularly to a type of pulley adapted for timing operations and made by formed sheet metal members disposed in close interfitting relationship with each other.

A primary object of the invention is to provide an efficient, simple and light weight all metal pulley having axially extending projections or teeth on its periphery adapted to engage a standard textile and rubber timing belt.

A feature of advantage of the invention is that one of the principal members forming the pulley has its periphery provided with an alternate groove and projection conformation to form teeth and also has an inwardly extending flange extending to the bearing surface of the shaft on which the pulley is mounted.

Another feature of advantage is that a companion member attached closely adjacent the first member has an outwardly extending flange beyond the peripheral surface of the first member and has an inwardly extending flange portion similar to that of the first member.

Another object of the invention is that a third member is provided attached to the periphery of the first member and forming a flange on the opposite edge of the grooved periphery of the first member.

Another feature of advantage is that the two flange portions adjacent the shaft bearing surface are separated a short distance and may be drawn together by suitable means extending between the flanges so that at the bearing surface of the flanges with the shaft the pressed metal is forced radially inward to form a substantial frictional bearing surface for engagement with the shaft.

And finally it is a feature of the invention to provide a suitable bearing surface for the flanges with the shaft by forming an axially extending flange at their shaft-engaging edges.

With the above and other objects in view, the invention may include the features of construction and operation set forth in the following specification and illustrated in the accompanying drawings.

In the accompanying drawing annexed hereto and forming a part of this specification, I have shown the invention embodied in a form of pulley particularly adapted for driving the timing mechanism of automotive vehicle engines, but it will be understood that the invention may be otherwise embodied and that the drawing is not to be construed as defining or limiting the scope of the invention, the claims appended to this specification being relied upon for that purpose.

In the drawing:

Figure 1 is a side elevation of a pulley made in accordance with the present invention, a portion being broken away to more clearly show its construction.

Fig. 2 is a partial sectional view taken on the broken line 2—2 in Fig. 1 and showing a portion of the outside view of the pulley shown in Fig. 1, and Fig. 3 is a partial sectional view of the pulley shown in Fig. 1 and taken on the plane of line 3—3 in Fig. 1.

In the above-mentioned drawing there has been shown but one embodiment of the invention which is now deemed preferable, but it is to be understood that changes and modifications may be made within the scope of the appended claims without departing from the spirit of the invention.

Briefly and in its broadest aspect the invention may include the following principal parts: First, a member made of formed sheet metal pressed into shape so that its peripheral surface is generally cylindrical and provided at spaced intervals with projections or teeth extending axially and adapted to engage the lugs or teeth formed on a belt adapted to be used with the pulley; second, a flange formed integrally on the member extending inwardly from the peripheral portions, the inner edge of the flange closely fitting the shaft on which the pulley is mounted; third, a second member made of formed sheet metal and attached in close engagement with surfaces of the first member; fourth, an inwardly extending flange on this second member similar to the flange on the first member; fifth, an annular member attached to the periphery of the first member and forming an outwardly extending flange; sixth, means to draw the inner portions of the inwardly extending flanges toward each other to firmly grip the shaft on which the pulley is mounted; and seventh, widened bearing surfaces on the inner edges of said flanges.

Referring more in detail to the figures of the drawing, it will be seen that the member 10 is formed from sheet material such as strip steel of uniform thickness. This member 10 may be shaped by a series of forming operations so that its periphery 12 forms the surface engaged by a driving or driven belt. As the pulley in the embodiment of the invention selected for illustration is adapted particularly for timing valve mechanisms of internal combustion engines such as those employed on automotive vehicles, the belt engaging periphery 12 is formed with spaced teeth or projections. The projections 14 extend from side to side of the periphery of this member 10 similarly to the teeth of spur gears. Extending inwardly from one side of this peripheral surface 12 is an integral flange 16. The flange 16 extends obliquely for a portion of its extent and is then flared at its inner portions as shown at 18.

Closely adjacent member 10 is a second or companion member 20, the outer periphery of which extends radially outward beyond the peripheral surface of the first member to form a flange 22. An inwardly extending integral flange 24 is provided conformed to closely fit against a side of the flange 16 on the first member. At its inner portions the flange 24 is flared at 26 similarly to the flange 16 of the first member 10 but in the opposite direction so that these portions 26 are spaced from the corresponding portions 18 of the flange on the first member 10.

In order to reinforce the pulley at its periphery 12 the free or open side of the toothed periphery has secured to it an annular member 28. This member 28 may be secured to the under surface of the periphery 12 and provides a radially outstanding flange 29 corresponding to flange 22.

The two principal members 10 and 20 are attached together as by spot welding, rivets or screws at spaced points so that the closely adjacent portions of the flanges 16 and 24 are rigidly held together. In the embodiment of the invention selected for illustration, spot welds 19 are provided at angularly spaced points in annular series at the outer and inner edges of the oblique portions of the flanges 16 and 24. The oblique portions of the flanges 16 and 24 between the annular series of spot welds are spaced slightly from each other to permit flexing of the inner portions of the flanges.

To removably attach the pulley to a shaft 30 the inner flared portions 18 and 26 of the flanges are provided with openings closely fitting the shaft. Bolts 32 connecting these portions of the flanges on members 10 and 20 when their nuts are tightened serve to draw the flanges toward each other and force the inner edges of the flanges into firm frictional contact with the surface of the shaft. As shown in Figs. 2 and 3, the inner edges 34 of the flanges 18 and 26 are bent outwardly to increase the area of the surface of the flanges 18 and 26 in engagement with the cylindrical surface of the shaft 30. Pressure of the flange surfaces 18 and 26 radially inward against the shaft to insure tightness will be spread over a wider area. The inner portions of the flange sections 16 and 26 are slitted as shown at 36. These slits are provided to make these portions sufficiently flexible to permit tightening of these portions against the shaft 30.

By virtue of the oblique disposition of portions 16 and 24 of the inwardly extending flanges the bearing surfaces of the inner edges 34 of the flanges 18 and 26 are intermediate the width of the peripheral surface 12 of the first member 10. The overall width of the pulley therefore is the same as the width of the pulley at the periphery of the first member 10.

I claim as my invention:

1. A pressed metal pulley comprising a member provided with axially extending teeth on its periphery, an oblique inwardly extending flange formed on said member, an inwardly extending flared portion on said flange apertured centrally for the shaft on which the pulley may be mounted, a second pressed metal member attached to said first member and having an oblique inwardly extending flange parallel to the first flange, said flange having an inwardly extending flared portion and apertured similarly to said first flange, said second member having its outer edge extending radially beyond the grooved periphery of the first member, and an annular member attached to the inner surface of the periphery of said first member and having an outwardly extending flange, whereby guiding flanges for the pulley are formed on opposite sides of its periphery.

2. A pressed metal pulley comprising a member provided with axially extending teeth on its periphery, an oblique inwardly extending flange formed on said member, an inwardly extending flared portion on said flange apertured centrally for the shaft on which the pulley may be mounted, a second pressed metal member attached to said first member and having an oblique inwardly extending flange parallel to the first flange and at its inner portion having a flared portion spaced from and apertured similarly to said first flange, said second member having its outer edge extending radially beyond the grooved periphery of the first member, an annular member attached to the inner surface of the periphery of said first member and having an outwardly extending flange, whereby said first member has guiding flanges on opposite sides, and means to draw the apertured flared portions of said inwardly extending flanges together to clamp the pulley to a shaft.

3. A pressed metal pulley comprising a member having a cylindrical periphery and provided with axially extending teeth thereon, an oblique inwardly extending flange formed on said member, an inwardly extending flared portion apertured centrally for the shaft on which the pulley may be mounted, a second pressed metal member attached to said first member and having an oblique inwardly extending flange having its intermediate portion closely adjacent and parallel to said first flange, said flange having an inwardly flared portion apertured similarly to said first flange, the flared portions on both flanges being radially slotted, said second member having its outer edge extending radially beyond the grooved periphery of the first member to form a guiding flange on one side, and a member attached to the inner surface of the periphery at the opposite side of said first member and having an outwardly extending guiding flange whereby said first member has guiding flanges on opposite sides of its cylindrical periphery.

References Cited in the file of this patent

UNITED STATES PATENTS

| 198,188 | Clemens | Dec. 18, 1877 |
| 940,106 | Wulff | Nov. 16, 1909 |
| 1,619,793 | Kerr | Mar. 1, 1927 |
| 2,198,787 | Nystrom | Apr. 30, 1940 |
| 2,460,510 | Laesser | Feb. 1, 1949 |